Sept. 18, 1962 P. E. BROOKS 3,054,887
WELDING FIXTURE
Filed Aug. 8, 1960 2 Sheets-Sheet 2
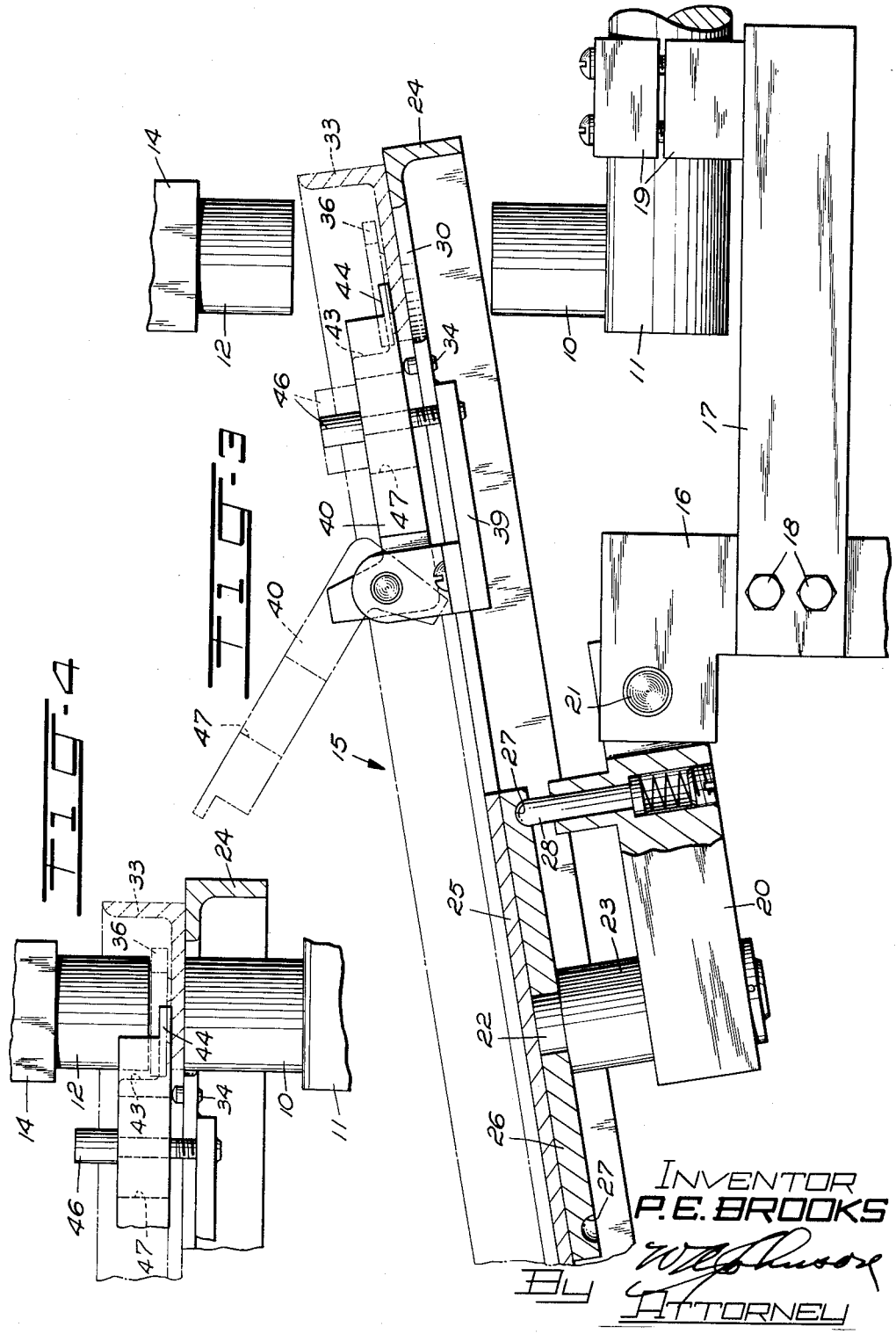
INVENTOR
P. E. BROOKS
BY
ATTORNEY United States Patent Office 3,054,887
Patented Sept. 18, 1962

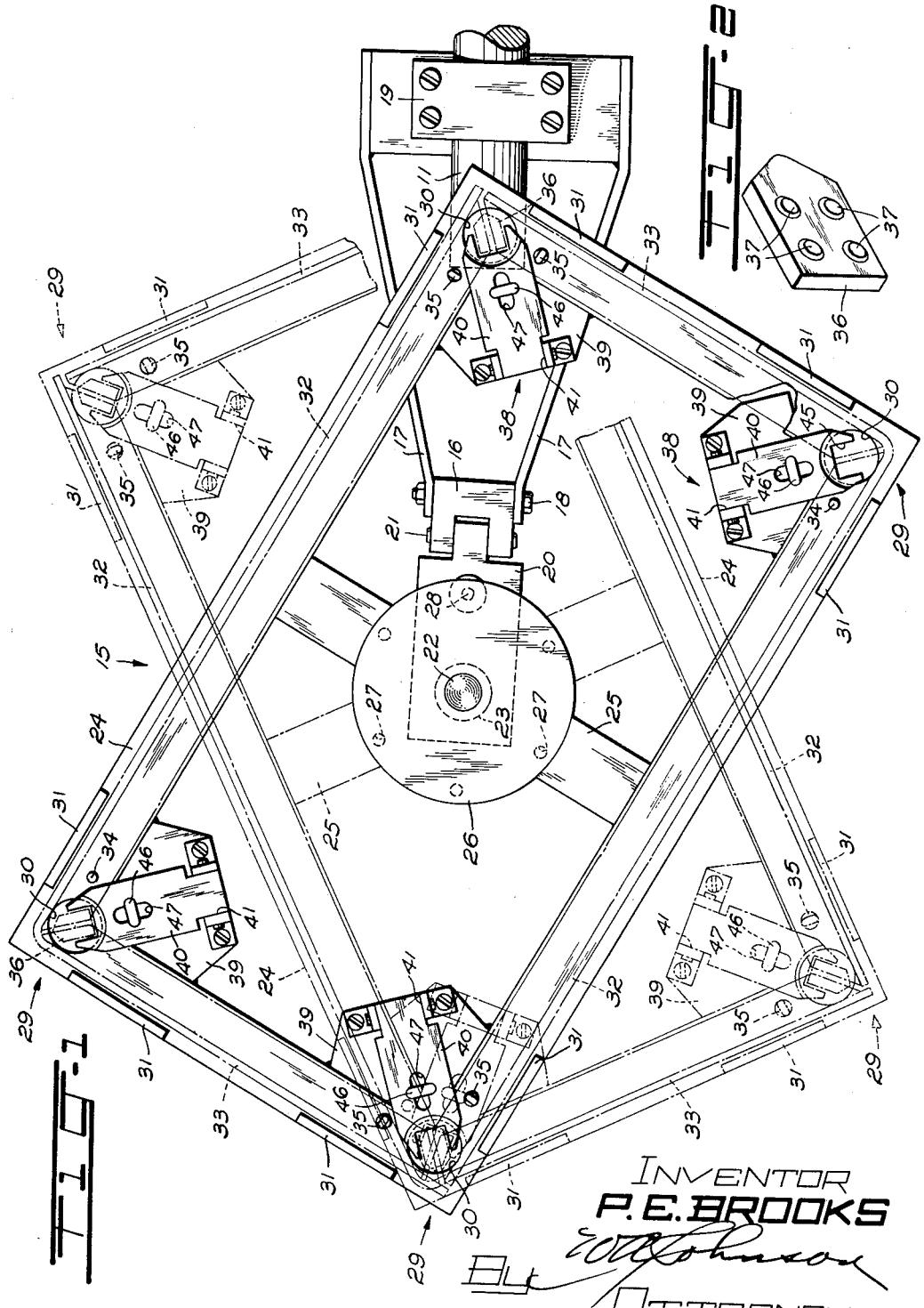

3,054,887
WELDING FIXTURE
Percy E. Brooks, Middletown, N.J., assignor to Western Electric Company, Incorporated, a corporation of New York
Filed Aug. 8, 1960, Ser. No. 48,168
2 Claims. (Cl. 219—158)

This invention relates to frame welding fixtures particularly fixtures for attachment to spot welding machines for welding structural steel angles into frames.

In the manufacture of certain types of telephone equipment, structural steel frames of particular sizes are required to support the various units of the equipment. In the past, frames of this type have been too heavy to handle conveniently, by one operator, requiring not only, in many instances, the assistance of a second operator, but the use of auxiliary tables to initially locate the ends of the steel angles relative to each other for welding. Regardless of the supporting means provided by the table for the initial positioning of the parts, these parts would have to be transported by sliding, lifting, and lowering onto a fixed position electrode of a spot welder, depending entirely upon the operator who moves and sights the parts to suit his judgment prior to operating the welder. These conditions require considerably more time than should be allowed for each welding operation and, depending solely upon the operator, there is frequently the element of error resulting in less than perfect welding operation. This condition exists throughout the four welding operations for each corner of a frame.

The object of the invention is a welding fixture on which parts for a frame may be assembled readily and moved accurately into welding position to perform successive efficient welds.

In accordance with the object, the invention comprises a frame welding fixture for a welder having one electrode fixed to a support and a movable electrode supported by a reciprocable ram, the fixture including a holder adapted to receive side and end parts of a frame to be welded and hold them in their respective positions with their pairs of companion ends positioned to form corners of the frame, and a spindle to support the holder about which the holder may be moved to position a pair of companion ends in engagement with the fixed electrode.

More specifically, the holder of the fixture has clamps pivotally mounted at each corner and adapted to be locked in place to firmly hold the parts of the frame in proper relative positions and to locate steel pads or joining parts with respect to the companion ends of the parts to serve as joining means for the parts when welded. The spindle for the holder is mounted on a pivotal element carried by a bracket secured to the support for the fixed electrode, the element having a spring-pressed plunger with its upper end receivable in successive recesses of a part of the holder to locate the holder for movement into welding position prior to movement about the pivot over the fixed electrode.

Other objects and advantages will be apparent from the following detailed description when considered in conjunction with the accompanying drawings wherein:

FIG. 1 is a top plan view of the fixture attached to a spot welding machine;

FIG. 2 is an isometric view of one of the steel pads used in the welding of the corners of the frame;

FIG. 3 is a fragmentary vertical sectional view of the fixture shown in tilted position with the welding machine open; and FIG. 4 is a fragmentary detailed view illustrating the completion of a weld with the fixture.

In the present illustration, a lower fixed electrode 10 of a welding machine is mounted on a support 11, such as a spot welder arm, and a movable electrode 12 is supported by a reciprocable ram 14 of the machine movable from the open position, shown in FIG. 3, to the closed position, shown in FIG. 4. The fixture, indicated generally at 15, has a bracket 16 which is attached to an arm 17 connected at 18 to the bracket and at 19 to the spot welder arm 11. An element 20 is mounted on a pivot 21 carried by the bracket 16 and supports a spindle 22 having a sleeve 23 mounted concentric therewith.

In the present instance, a rectangular holder 24, of a size corresponding to the size of a frame which is to be formed thereon, has outer portions substantially angular in cross-section and a central connecting member 25. An annular plate 26 is fixed to the central member 25 concentric with the spindle 22 and has recesses 27 therein at desired locations to serve in conjunction with a spring-pressed pin 28 mounted in the element 20 to serve in locating the welding corners 29 of the holder in general alignment with the electrodes 10 and 12. The holder has circular openings 30 in each corner 29 to receive the lower electrode 10. Also, vertical locating members 31 are mounted short of the corners at the sides and ends of the holder to assist in locating side parts 32 and end parts 33 to be welded. The parts 32 and 33, in the present instance, have apertures 34 short of the angular ends which are utilized by the provision of oval locating pins 35 mounted on the holder at the position shown to further assist in locating the parts 32 and 33 on the holder.

It is not possible to conveniently weld the angle end surfaces of the parts 32 and 33 together and to form a straight and suitable weld. A steel pad 36, of the contour shown in FIG. 2, with the two pairs of projections 37, when resting on their respective ends of the parts 32—33, serve as the actual connection through the welding operation to join the companion ends of the parts together.

Like clamps 38 include members 39 fixed to the corners of the holder 24 with arms 40 hinged at 41 thereto and provided with reduced ends recessed at 43 to receive the upper electrode 12 and further formed to provide portions 44 which will accomplish two purposes: (1) to rest upon and firmly hold the companion ends of the adjacent parts 32 and 33; and (2) to provide a locating pocket 45 for each pad or joining part 36. Each clamp has a latch 46 adapted to extend through an elongate opening 47 in the member 40 to be rotated transversely of the aperture when the member 40 is in its holding position to firmly clamp the parts of the frame to the holder.

Operation

With this fixture mounted as shown on, or adjacent to, the welding machine at a definite location with respect to the fixed electrode 10 of the welder, the holder may be moved in any desired position free of the electrodes of the welder to permit the operator to assemble the parts 32 and 33 on the holder, to secure them in position by the aid of the clamps 38 through the assistance of the locating means 31 and 34, and locate the steel pads 36 in position in the recesses 45 of the clamps, after which no further assistance is required of the operator other than the rocking of the holder about its pivot 21 so that the holder, with the parts, may be moved between the electrodes, as shown in FIG. 3, until the spring-pressed pin 28 enters the desired recess 27. At this time, the ends of the companion parts are in general alignment with the electrodes and by tilting or rocking the holder about its pivot 21 until the companion ends are brought to rest on the lower electrode, the conventional switch for bringing about an operating cycle of the welding machine may be actuated to complete the welding of one corner of the frame.

This operation may be repeated after the opening of the welder following each welding operation to permit tilting of the holder about its pivot 21 and the partial rotation of the holder about the spindle 22 to locate the next pair of companion ends to be welded. In this manner, the heavy frame may be moved with very little effort into the four different welding positions without disturbing the electrodes and without disturbing the setting and location of the parts to assure a perfect formation of a frame through the four welding operations.

The fixture, because of its weight distribution, tilts away from the lower electrode without the aid of an operator when the upper electrode rises to its normal position and the fixture is in this position when parts are loaded into the fixture. In the event the operator does not move the fixture to its normal projection spot weld level, the down stroke of the upper electrode will perform this operation. Furthermore, the fixture also has the advantage of being operated by an operator while sitting.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A frame welding fixture in combination with a welder having one electrode with a surface lying in a given plane fixed to a support and a movable electrode secured to a reciprocable ram in alignment with the fixed electrode, the fixture comprising a holder adapted to receive side and end parts of a frame having angular ends disposed in pairs to be welded to joining parts overlaying the pairs of angular ends, the holder having apertures disposed adjacent the pairs of angular ends sufficiently large to receive the fixed electrode free of contact therewith for successive engagement of the pairs of angular ends with the fixed electrode, means mounted on the holder to locate the side and end parts for each frame in a given plane on the holder with the pairs of angular ends at their respective apertures, a spindle disposed at right angles to the plane of the holder to rotatably support the holder, a bracket fixed to the support and extending beneath the holder, an arm-like element pivotally mounted on the bracket and supporting the spindle so that the holder may be rocked about the pivotal mounting toward and away from the fixed electrode for positioning the parts on the holder and for moving the successive pairs of angular ends into engagement with the upper surface of the fixed electrode for welding, the spindle supporting the holder for rotation on the element for movement of the holder when tilted at an angle between the electrodes to move the pairs of angular ends into welding positions between the electrodes, and a clamp pivotally mounted at each of the four corners of the holder and having a recess in a reduced portion thereof to receive and locate the joining part in engagement with the angular ends of the adjacent side and end parts.

2. A frame welding fixture according to claim 1 in which the reduced portion of each clamp is smaller in thickness than the thickness of each joining part to lie between but free of the electrodes, and means actuable for each clamp to force the parts adjacent the angular ends closely adjacent the holder.

References Cited in the file of this patent

UNITED STATES PATENTS

| | | |
|---|---|---|
| 1,550,651 | Charter | Aug. 18, 1925 |
| 1,554,385 | Still | Sept. 22, 1925 |
| 2,256,988 | Michailoff | Sept. 23, 1941 |
| 2,421,973 | Trimble | June 10, 1947 |